UNITED STATES PATENT OFFICE.

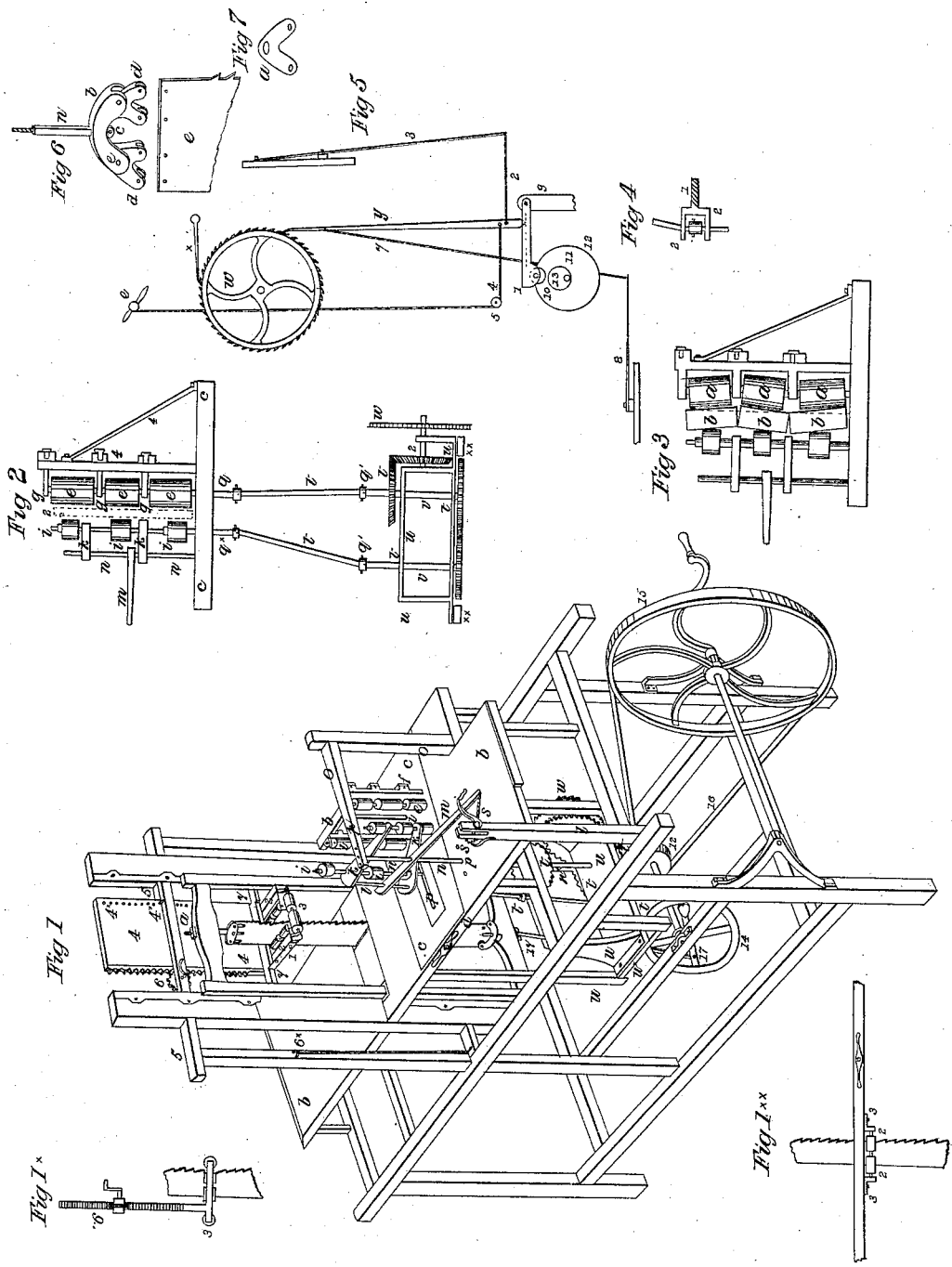

PEARSON CROSBY, OF FREDONIA, NEW YORK.

SAWMILL FOR RESAWING BOARDS AND OTHER TIMBER.

Specification forming part of Letters Patent No. 2,321, dated November 3, 1841; Reissued March 10, 1849, No. 130.

*To all whom it may concern:*

Be it known that I, PEARSON CROSBY, of Fredonia, Chautauqua county, and State of New York, have invented a new and useful Improvement in Machines for Resawing Boards and other Timber, which is described as follows, reference being had to the annexed drawings, which make a part of this specification.

The principal object of this machine is to re-saw boards and plank so as to divide them into parts much smaller than has been done by any mill heretofore constructed, as a board of ¼ of an inch thick may be split into two equal parts.

The peculiarity of this mill consists, first, in a system of vertical rollers and accompanying apparatus by which the boards or planks are held and carried to feed the saw, second, the method of regulating the feed and the thickness of the cut. Third, the method of straining the saw. Fourth, the method of changing the position of the rollers so as to cut diagonally for clapboarding, &c.

As the frame possesses no novelty, it is unnecessary to make a particular description of it. The saw frame is much lighter and narrower than the ordinary one. I strain the saw by the following contrivance. Instead of the common stirrup I use bolts as at Figure 6 which pass through the upper and lower girts of the gate, and are secured and strained by nuts, one of which is seen at $a$, Fig. 1. One end of the bolt is fastened and passes through a horizontal beam $b$, Fig. 6, which rests on a pin passing through said bolt as at $c$. The beam is susceptible of a vibration as well as a lateral movement. At each end of this beam is another beam in form of a vee (V) as $d$, $d$, resting on pins $e$, $e$. These beams also may vibrate and move laterally by means of oblong holes as at $a$ Fig. 7. The ends of beam $b$, are open or split so as to receive the end $a$, Fig. 7. The lower ends of the beams $d$, $d$, are also open or split so as to receive the saw, of which $e$ is a section. The holes in the saw and in the beams $d$, $d$, are to receive pins or rivets. By means of the oblong holes as, $a$, Fig. 7, the saw may have an equal strain, and by a lateral shift of beam $b$, on the pin $e$, the strain may be thrown on the front of the saw, and give the saw more or less rake. By means of a bolt as $a$, Fig. 6, passing through the center of each girt, not only the saw is kept in place but the gate is kept in proper trim, or balance, and not allowed to twist or warp; and this construction requires much less weight of metal or materials.

In addition to the straining apparatus already described, for stiffening the saw, I use the following apparatus (similar to that described in my patent of June 7, 1838). In order to be able to use a very thin saw, I make use of the following contrivances for keeping the saw true, and preventing its running aside. Between the two center posts of the frame, and at a suitable height is placed the stock 1, 1, Fig. 1, containing rollers, as 2, 2, between which the saw moves; by regulating screws these are kept in place.

3, is a grooved roller, for the purpose of keeping the board from rising; opposite to this last mentioned and back of the saw is another, like 3, out of view in this figure but as at 3 Fig. $1^\times$ also to prevent the board from bearing against the back of the stock. 4, 4, is a piece extending up from the stock passing through a mortise or opening in the frame piece 5, 5, with the rack 6. In the frame piece 5, 5 is a pinion below 6 by which the rock is raised or lowered to regulate the height of the stock and rollers. On the right in the piece 4, 4 is a series of holes as $4^\times$ $4^\times$ &c. to receive a pin as at the lower $4^\times$ to retain or hold up the piece 4. Instead of a series of holes and a pin a ratchet and hand may be used for this purpose, the ratchet might be on the shaft of the pinion which raises the rack. The cross part 7, 7, is a horizontal extension of 4, 4, sliding against the uprights; against which the gate slides, to keep the piece 4, 4, and stocks and rollers steady. There is also another stationary stock with rollers below the platform $b$, $b$, for the same purpose of regulating or steadying the saw. These rollers are out of view in this figure. At 2, 2, Fig. $1^{\times\times}$, are the rollers under the platform $b$, $b$, being a side view of a section of the platform and saw, with the bearings 3, 3, of one of the set of rollers on one side of the saw.

To hold the board or plank to be sawed, I use the following apparatus. On the platform $b$, $b$, Fig. 1, is a cross slide platform or carriage $c$, $c$, which is moved laterally on the first platform by means of a set screw, as at $d$, Fig. 1. On this platform ($c, c,$) is arranged the 6 vertical rollers, $e, e,$ Fig. 1. $e, e,$ Fig. 2, also shows an end view of the same. $f, f$, Fig. 1, and $f, f$, Fig. 2, is a metal frame to support the rollers which in these figures are represented as being on one shaft, having the projecting bearings $g, g, g,$ Fig. 2; and the lower bearings are in the platform $c, c,$ Figs. 1 and 2. There is another set of rollers as $i, i, i,$ Fig. 1, and $i, i, i,$ Fig. 2, (which is an end view.) These last also consist of 2 sets corresponding with the first set $e, e$. By the horizontal pieces $k, k,$ the sets are connected, and they form bearings and supports for them. Through the pieces $k, k,$ passes a shaft $l$, passing through the lever $m$, which $m$ has for its fulcrum the shaft $n, n;$ this shaft $n, n,$ is supported at the top by the frame $o, o.$ By an arrangement of holes or bearings, $p, p,$ the position of the shaft $n, n,$ may be altered to suit different sizes of timber; like letters in Figs. 1 and 2 refer to the same pieces. The shaft $l$, is placed in the pieces or levers $k, k,$ so as to come sufficiently between the two sets of rollers $i, i,$ to have a partial effect of the lever $m$, on the near rollers or those which introduce the boards. The lower part of the shaft of the far rollers passes down through a slot $p$, in the slide $c, c,$ as $q^x$ Fig. 2. The board, an end view of which is represented by the dots $z\ z$, being placed between the rollers, then by means of the lever $m$, which possess suitable elasticity, and the winch, drum, cord and ratchet and hand, as at $s, s,$ Fig. 1, the rollers connected with the lever press the board against the rollers on the right. The shaft of the far rollers $e, e,$ passes through the platform $c, c,$ as seen at the right hand $q$, Fig. 2.

The lateral movement of the carriage $c, c,$ by means of the set screw $d$, is for the purpose of regulating the thickness to be cut; as the rollers in the frame $f, f,$ are by this means thrown nearer to, or farther from a line with the saw. The rollers on each side of the board turn in toward each other to advance the board to the saw; and the rollers on each side nearest the saw have the shafts extended down to the driving wheels Fig. 2, $t, t, t, t, t, t,$ Fig. 1 and $t, t, t,$ &c., Fig. 2 refer to the same. Z, in both figures is the same.

$u, u, u,$ Fig. 1 is a frame work (which is not fully seen in this figure) which supports and holds the parallel parts of the shafts at V, V, Fig. 2 which are stationary relatively to each other. $u, u, u,$ Fig. 2 is an end view of the frame, $u, u,$ Fig. 1, supported by the timbers $u^x, u^x\ u^x$ Fig. 1. $v^x$, $v^x$ Fig. 2 are the same as one piece $u^x$ Fig. 1, there being one like it at the right under the piece $u\ u,$ Fig. 1.

As the right and left rollers to accommodate different thicknesses of stuff require either to approach to, or recede from each other, it is requisite to use universal joints in the axles as at $q^x, q,$ and $q', q',$ Fig. 2.

W Fig. 2 is the feeding ratchet on the same shaft with the miter wheel $v$.

W, Fig. 5 is a side view of the feeding ratchet with the pawl $x$.

Y, is the feeding rod which moves the ratchet. The lower end of this feeding rod rests on the horizontal piece or lever 1. This lever has a groove, represented by the dots, in which the tongued base of the feeding rod rests.

2, is a cord attached to the rod and also to the end of a spring 3 which may be wood or metal, of suitable length to give the requisite motion.

4, is a cord attached to the feeding rod or hand and passes around a pulley 5, and extends up to a fastening 6, convenient to the tender.

$6^x$ Fig. 1 is the fastening.

7 Fig. 5 is a cord attached to the feeding hand near the top and extends downward, to a horizontal spring 8.

The position and arrangement represented by, 2, 3, 4, 5 and 6, are to place and retain the hand $y$, on any part of the lever 1, for the required feed.

At 9, is the fulcrum of the lever on a portion of the frame of the mill.

10, is a roller in the end of beam 1, on which plays the eccentric driver 11.

The circle 12 is the drawing pulley 12 of Fig. 1.

13, Fig. 5 is the shaft of cam 11, pulley 12 and fly 14 driven by wheel 15 and belt 16 of Fig. 1.

17, 17 Fig. 1 is the connecting rod between the crank pin on the fly wheel and the gate.

To saw diagonally, the feeding rollers at the right, as $a, a, a,$ Fig. 3, are put in the position represented in this figure, by means of universal joints between the rollers, and by means of set screws, as at 1 Fig. 4, with branched bearings 2, 2, the joints and bearings in the other figures being covered.

$b, b, b,$ Fig. 3, are pieces of stuff to be sawed, confined by the feeding rollers. The dotted lines represent the line of the cut of the saw. Instead of 3 rollers, one above the other more or less may be introduced, as required.

What I claim as my invention, and desire to secure by Letters Patent, is,

1. The combination and arrangement of the apparatus for holding the timber, as before described and represented in Figs. 1, and 2, consisting of the rollers $e, e, e,$ and $i, i,$ and levers $k, k,$ and $m, m.$ 2. The combination and arrangement of the parts for feeding as represented at Fig.

5, and before described, consisting of the parts, 1, 2, 3, 4, 5, 6, 7, 8, 9, 10, 11, 12, W, X, Y.

3. The construction and arrangement of the apparatus for straining the saw as before described and represented at Fig. 6, consisting of the pieces, $a$, $b$, $d$, $d$, and $a$ Fig. 7.

4. The method of changing the position of the feeding or holding rollers, by means of the joints, as represented at Fig. 4, and before described, the whole operating as, and for the purpose set forth in the specification.

PEARSON CROSBY.

Witnesses:
JOHN W. POST,
DAVID H. KEAVINS.

[FIRST PRINTED 1913.]